April 14, 1953 E. B. COOK 2,634,616
VIBRATORY ASSEMBLAGE
Filed Dec. 22, 1949
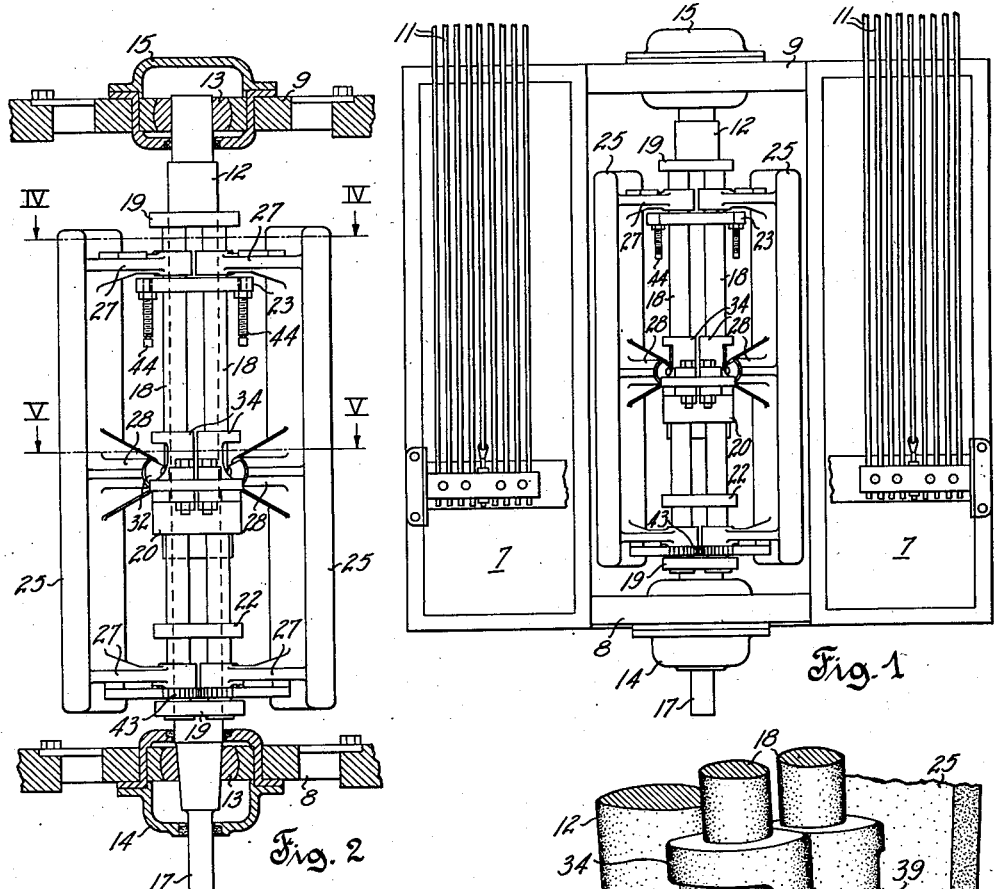
Fig. 1
Fig. 2
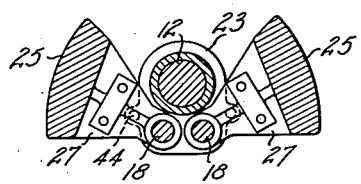
Fig. 4
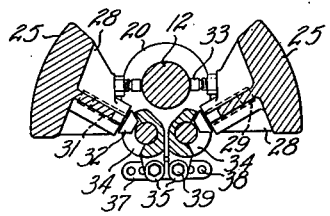
Fig. 5
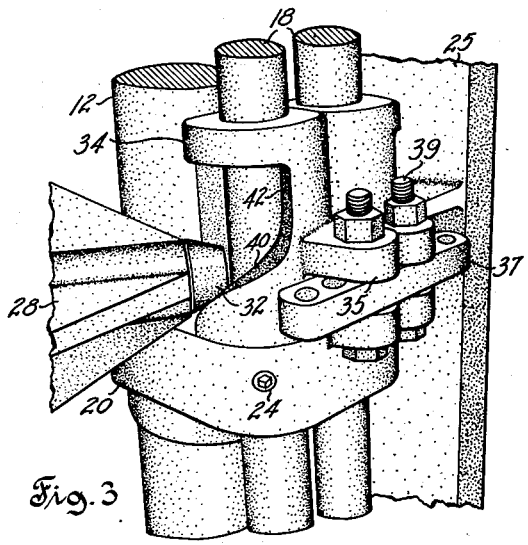
Fig. 3
Inventor
Eugene B. Cook
by Wayne B. Easton
Attorney Patented Apr. 14, 1953

2,634,616

UNITED STATES PATENT OFFICE 2,634,616

VIBRATORY ASSEMBLAGE

Eugene B. Cook, Hales Corners, Wis., assignor to Allis-Chalmers Manufacturing Company, Milwaukee, Wis., a corporation of Delaware Application December 22, 1949, Serial No. 134,395

12 Claims. (Cl. 74—87)

This invention relates to vibratory assemblages, and specifically to a vibratory mechanism thereof, in which the vibrational effect is created by a displacement of one or more weights. The invention is particularly adapted for embodiment in gyratory sifters. The principal object of the invention is to provide new and improved vibratory mechanisms of these types.

Heretofore the magnitude of vibration of such mechanisms was varied by either increasing or diminishing the eccentricity of the weights with respect to an axis of rotation about which they revolved. Considerable difficulty however was experienced during the starting or the stopping of the vibrator, due to a critical vibrational frequency occurring at certain speeds at which the weights were rotated. The disturbance therefrom often resulted in damage to the unit, and hence there arose the need to obviate this undesirable effect. It was discovered that by retaining the weights substantially concentric about the axis of rotation during rotational speeds, which prior to this time produced the critical vibrating frequencies, the excessive vibrations could be eliminated. One of the schemes for effecting the desired result comprised a means in which the weights were axially displaceable in accordance with their eccentricities with respect to the axis of rotation. Therefore before the weights could assume an eccentric position, a centrifugal force, great enough to overcome the resistance to axial displacement had to be imparted to them. This resistance to axial displacement was predetermined to require rotational speeds sufficient to prevent critical vibrating frequencies from occurring when the weights swung into their eccentric operating positions. The prior devices of the type hereinabove generally described, were, to the best of my knowledge, restricted to one fixed magnitude of vibration at a given speed of rotation, and therefore the vibratory unit was necessarily oriented in the assemblage to uniformly distribute the vibrations. Hence when it was desirable to vary the magnitude of vibration for different kinds of material being processed, the weight system had to be reoriented or other major changes made in the vibratory mechanism to assure uniform distribution of the vibrations. It is therefore another object of the invention to provide means for accomplishing the hereinabove stated function in a simple and efficient manner.

A more specific object of the invention is to provide positive means for maintaining the mass center of the weights in line with the center of gravity of the assemblage at various magnitudes of vibration.

Other objects will appear hereinafter as the description of the invention proceeds.

The novel features of the invention and how the objects are attained will appear from this specification and the accompanying drawing forming a part of this application, and all these novel features are intended to be pointed out in the claims.

In the drawings:

Fig. 1 is a side elevational view of a vibratory assemblage embodying the invention;

Fig. 2 is an enlarged elevational view partly in section of a vibratory mechanism embodying the invention;

Fig. 3 is a perspective view, on an enlarged scale, of a detail of Fig. 2;

Fig. 4 is a sectional view taken along line IV—IV of Fig. 2; and

Fig. 5 is a sectional view taken along line V—V of Fig. 2.

Referring to Fig. 1 the assemblage generally comprises a vibratory mechanism oriented as herein shown symmetrically between a plurality of material receiving units 7. A lower frame 8 and upper frame 9 rigidly join the units 7, and provide a carrying means for the vibratory mechanism. The entire assemblage may be freely suspended from an overhead structure (not shown) by reeds 11, or resiliently supported by springs, rubber blocks or other suitable means permitting free vibratory motion thereof.

A rotatable shaft 12 is journaled for rotation in oversized spherical bearings 13 of the selfaligning type, carried in a lower bearing housing 14 and an upper bearing housing 15 respectively secured to the lower frame 8 and upper frame 9. The rotatable shaft 12 may be driven by a belt and motor (not shown) or other suitable driving means from either end; but the shaft 12 is herein shown as having a portion 17 extending through the lower bearing housing 14, the portion 17 being adapted to have a belt pulley (not shown) mounted thereon or to be driven through a coupling (not shown) or in any other suitable way.

Eccentrically disposed to the rotatable shaft 12 is a pair of parallel shafts 18 having axes parallel to the axis of the rotatable shaft. The parallel shafts 18 are rigidly spaced from and carried on the rotatable shaft 12 by a series of brackets, comprising end brackets 19, an intermediate bracket 20 and lower and upper brackets 22, 23, respectively. Each of the brackets is provided with three cylindrical holes, for respectively receiving the rotatable shaft 12 and the parallel shafts 18. Set screws may be threaded through the respective brackets radially to each of the cylindrical holes for fixing each bracket securely to the rotatable shaft 12 and the pair of parallel shafts 18. The bracket 20 appears in Fig. 3, and set screws 24 for fastening the bracket 20 to one of the shafts 18 are visible.

A pair of flyweights 25 is swingably carried about the parallel shafts 18 by carrying arms 27 extending from opposite ends of the flyweights. The carrying arms 27 are formed with bores at their free ends to slidably receive respective portions of the parallel shafts 18 between the end brackets 19 and lower and upper brackets 22, 23, respectively. Extending from a point substantially midway between the ends of each flyweight 25 is a follower arm 28 provided with a cylindrical bore 29 radial to the axes of the parallel shafts 18 for rotatably receiving the shank 31 of a follower 32. Referring to Fig. 5 it is seen that the follower arms 28 are also adapted to receive adjustable bolts 33 which will radially strike the rotatable shaft 12 when the centrifugal force imparted to the flyweights 25 is decreased below a critical point.

Pivotal about the axis of, and carried by the parallel shafts 18, is a pair of cams 34 axially supported by the intermediate bracket 20 as clearly illustrated in Fig. 3. Integral with each cam 34 is an arm, herein shown as a bifurcated arm 35, for receiving a cam engaging bar 37. A plurality of holes 38 are formed in the bar 37 to receive bolts 39 passing through the furcations of the arm 35, for adjusting the pivotal position of the cams 34. A guide path is formed in each cam 34, commencing at its lower end as a helix 40 and merging into a longitudinal surface 42 approximately midway the length of the cam. The guide path surface conforms to engage the surface of the follower 32, which is herein shown as a frusto-conical surface, but which may be cylindrical or of any other suitable shape.

To assure equal displacement of the followers 32 along the guide path of the cams 34, the flyweights 25 are constructed to swing in unison. To this end coacting meshing gear segments 43 are secured to the respective flyweights 25, as here shown on the lower carrying arms 27.

Preparatory to operating the vibratory mechanism at its maximum efficiency, various adjustments are necessary. To facilitate the ease in making the adjustments, a pair of axially adjustable bolts 44 are threaded through the upper bracket 23. By turning the bolts 44 in one direction to press upon the upper carrying arms 27, the flyweights 25 can be raised to relieve their weight from the cams 34. The cams 34 may now be axially moved to a point on the parallel shafts 18, that will limit the upward axial motion of the flyweights 25 when in operative position, to where the mass center of the flyweights will be coincident with the center of gravity of the material receiving units 7, as hereinafter more fully described. Obviously the intermediate bracket 20 which supports the cams 34 must be brought into abutting relationship therewith and secured to the rotatable and parallel shafts 12, 18, respectively, to prevent downward axial slippage of the cams. The pivotal positions of the cams 34, when secured together by the cam engaging bar 37, will determine, as herein previously stated, the magnitude of vibration, by limiting the angular positions of the flyweights 25 with respect to the axes of the parallel shafts 18 when the vibrator is in operation. Therefore, with the cam engaging bar 37 removed the cams 34 are free to pivot about the parallel shafts 18, and hence may be rigidly resecured in any one of several pivotal positions by means of the bolts 39 passed through the bifurcated arm 35 and the selected pair of holes 38 in the cam engaging bar. With the cams 34 thus adjusted, the pair of axially adjustable bolts 44 may now be turned in the opposite direction to permit the flyweights 25 to rest entirely upon the guide path of the cams 34 by means of the followers 32.

The operation of the vibratory assemblage is as follows. As the rotatable shaft 12 begins to rotate, the flyweights 25 will remain in their substantial concentric relation to the axis of rotation, until the centrifugal force transmitted to them is great enough to overcome the resistance imposed upon the followers 32 by the helical guide path 40 of the cams 34. With an increase in rotational speed beyond the herein aforesaid condition, the axial displacement of the flyweights 25 is limited by the contact engagement of the followers 32 with the longitudinal surface 42. The angular displacement of the followers is limited as predetermined by the pivotal set of the cams 34. In other words, when the radially extended axes of the followers 32 coincide with an imaginary line on the guide path of the cam 34, as defined by the mergence of the helix 40 with the longitudinal surface 42, the flyweights 25 will be restrained from further displacement at any normal operating speed, due to the resistance offered by the longitudinal surface. It is therefore evident that with the proper prior axial adjustment of the cams 34, the mass center of the flyweights 25 will be in line with the center of gravity of the material receiving units 7 at any predetermined operative angular displacement of the flyweights. Hence the displacement of the flyweights 25 is axially limited by the longitudinal surface 42 of the cams 34, for any one of a series of magnitudes of vibration.

Fig. 3 clearly shows that with any of the permissible pivotal positions of the cams 34, the axial limited displacement of the flyweights 25 will remain constant.

From the foregoing it will be apparent to those skilled in the art that the illustrated embodiment of the invention provides new and improved vibratory assemblages and accordingly, accomplishes the objects of the invention. On the other hand, it will be obvious to those skilled in the art, that the illustrated embodiment of the invention may be variously changed and modified, or features thereof, singly or collectively, embodied in other combinations than that illustrated, without departing from the spirit of the invention, or sacrificing all of the advantages thereof, and that accordingly the disclosure herein is illustrative only, and the invention is not limited thereto.

It is claimed and desired to secure by Letters Patent:

1. A vibratory assembly, comprising a frame, a shaft journaled for rotation in said frame, weights carried by said shaft and swingably disposed about axes eccentric to the axis of rotation of said shaft, said weights being angularly and axially displaceable with respect to said eccentric axes, cams pivotal about said eccentric axes, and followers secured to said weights and engageable in guide portions of said cams for limiting said axial displacement of said weights at variable predetermined operative angular displacements thereof.

2. A vibratory assembly, comprising a frame, a shaft journaled for rotation in said frame, a pair of dependently swingable weights, said weights being angularly and axially displaceable about axes eccentrically disposed parallel to the axis of rotation of said shaft, followers secured to said weights extending radially to said parallel axes, cams pivotal about said parallel axes, said cams beings engageable with said followers for limiting said angular and said axial displacements of said weights.

3. A vibratory assembly, comprising a frame, a shaft journaled for rotation in said frame, a pair of parallel shafts spaced eccentrically to said rotatable shaft, a pair of weights, means for carrying said weights on said parallel shafts in angular and axial displaceable relationship thereto, a pair of cams pivotally secured respectively to said parallel shafts, followers secured to said weights and extending radially to said parallel shafts, said followers engageable with said cams for limiting said axial displacement of said weights at predetermined angular displacement thereof, and intermeshing gear segments secured to said weights for effecting dependent angular displacements of said weights.

4. A vibratory assembly, comprising a frame, a shaft journaled for rotation in said frame, a pair of parallel shafts spaced eccentrically to and carried by said rotatable shaft, a pair of weights provided with carrying arms extending from opposite ends of said weights, said carrying arms being slidably receivable on said parallel shafts for allowing angular and axial displacement of said weights, followers extending radially from said weights intermediate said carrying arms to said parallel shafts, a pair of cams pivotally carried by said parallel shafts, and engageable with said followers, means for angularly adjusting said cams for determining said angular displacement of said weights and simultaneously limiting said axial displacement to a fixed point, and intermeshing gear segments secured to said weights for effecting dependent angular displacements of said weights.

5. A vibratory assembly comprising: a frame; a main shaft journaled for rotation in said frame; first and second parallel secondary shafts carried by said main shaft and spaced eccentrically thereto; first and second weights; means for carrying said first and second weights respectively on said first and second secondary shafts in angular and axial displaceable relation thereto; first and second cams respectively angularly adjustable relative to said first and second secondary shafts; a follower secured to each of said weights and extending toward said secondary shafts, said followers being respectively engageable with said first and second cams for limiting said axial displacement of said first and second weights respectively at predetermined angular displacements thereof; and first and second intermeshing gear segments respectively secured to said first and second weights for effecting dependent angular displacements thereof.

6. A vibratory assembly comprising: a frame; a main shaft journaled for rotation in said frame; first and second parallel secondary shafts spaced eccentrically to said main shaft and carried thereby; first and second weights provided with carrying arms extending from opposite ends thereof, said carrying arms of said first and second weights being respectively slidably disposed on said first and second secondary shafts for allowing angular and axial displacement of said weights; first and second followers extending respectively from said first and second weights intermediate said carrying arms toward said first and second secondary shafts; first and second cams angularly adjustably carried respectively by said first and second secondary shafts and engageable respectively with said first and second followers; means for angularly adjusting said cams for determining said angular displacement of said weights and simultaneously limiting said axial displacement of said weights to a predetermined position, and first and second intermeshing gear segments respectively secured to said first and second weights for effecting dependent angular displacement thereof.

7. A vibratory assembly comprising: a frame; a main shaft journaled for rotation in said frame; first and second secondary shafts carried by said main shaft and spaced parallel thereto; first and second cams respectively carried by and angularly adjustable relative to said first and second secondary shafts; a first and second weight in respective engagement with said first and second cams and swingably respectively disposed on said first and second secondary shafts and radially and axially displaceable relative to said main shaft; said weights being limited in said radial displacement by said cams in response to rotation of said main shaft to vibrate said assembly at a predetermined amplitude in accordance with said angularly adjusted position of said cams, and being limited to a predetermined axial displacement for any said angularly adjusted position of said cams; and intermeshing gear segments secured to said weights for effecting dependent radial displacement thereof.

8. A vibratory assembly comprising: a frame; a main shaft journaled for rotation in said frame; first and second secondary shafts carried by said main shaft and spaced parallel thereto; first and second cams respectively carried by said first and second secondary shafts; common means for interconnecting said cams in angularly adjusted position relative to said main shaft; first and second weights oppositely swingably disposed on said first and second secondary shafts respectively and radially and axially displaceable relative to said main shaft; first and second followers respectively extending from said first and second weights and respectively engaging said first and second cams; said first and second followers coacting respectively with said first and second cams for limiting said weights in said radial displacement in accordance with said angularly adjusted position of said cams to impart a predetermined amplitude of vibration to said assembly, and limiting said weights to a predetermined axial displacement relative to said main shaft for any said angularly adjusted position of said cams; and intermeshing gear segments secured to said weights for effecting dependent radial displacement thereof.

9. A vibratory assembly comprising: a frame; a main shaft journaled for rotation in said frame; first and second secondary shafts carried by said main shaft and spaced parallel thereto; first and second weights oppositely swingably disposed on said first and second secondary shafts respectively in radial and axially displaceable relation relative to said main shaft; intermeshing gear segments secured to said weights for effecting dependent radial displacement thereof; first and second cams respectively carried by said first and second shafts; common means for interconnecting said cams in angularly adjusted position; follows respectively extended from said first and second weights in coacting engagement with said first and second cams for limiting said weights in said radial displacement to impart a predetermined amplitude of vibration to said assembly in accordance with said angularly adjusted position of said cams; and adjustable supporting means for axially positioning said cams to a predetermined point for axially limiting said weights to said predetermined point for any said angularly adjusted position of said cams.

10. A vibratory assembly comprising: a frame; a main shaft journaled for rotation in said frame; a secondary shaft carried by and spaced eccentrically to said main shaft; at least one weight swingably carried by said secondary shaft in radially and axially displaceable relation with respect to said main shaft; at least one cam carried by said secondary shaft for engagement with said weight for resisting said radial displacement of said weight when said main shaft is rotated, said cam being angularly adjustable with respect to said secondary shaft for limiting said radial displacement of said weight to a predetermined position corresponding to the adjusted angular position of said cam.

11. A vibratory assembly comprising: a frame; a shaft journaled for rotation in said frame; weights carried by said shaft, said weights being swingably disposed about respective axes spaced parallel to said shaft in radially and axially displaceable relation with respect to said shaft; cams carried by said shaft in engagement with said weights for respectively resisting said radial displacements of said weights when said shaft is rotated, said cams respectively being angularly adjustable about said axes for limiting said radial displacements of said weights to predetermined positions corresponding to the adjusted angular positions of said cams.

12. A vibratory assembly comprising: a frame; a main shaft journaled for rotation in said frame; at least one secondary shaft carried by said main shaft and spaced parallel thereto; a cam secured to said secondary shaft and angularly adjustable to predetermined positions relative thereto; a weight in engagement with said cam and swingably disposed on said secondary shaft in radially and axially displaceable relation with respect to said main shaft, said cam being formed to resist radial displacement of said weight when said shaft is rotated and to limit said radial displacement to predetermined positions corresponding to the adjusted angular positions of said cam.

EUGENE B. COOK.

References Cited in the file of this patent

UNITED STATES PATENTS

| Number | Name | Date |
|---|---|---|
| 1,383,676 | Thompson | July 5, 1921 |
| 2,192,420 | Stroud | Mar. 5, 1940 |
| 2,479,682 | Heberbrand | Aug. 23, 1949 |